(No Model.)
L. B. GIBSON.
MOTOR FOR STREET CARS.
No. 384,145. Patented June 5, 1888.
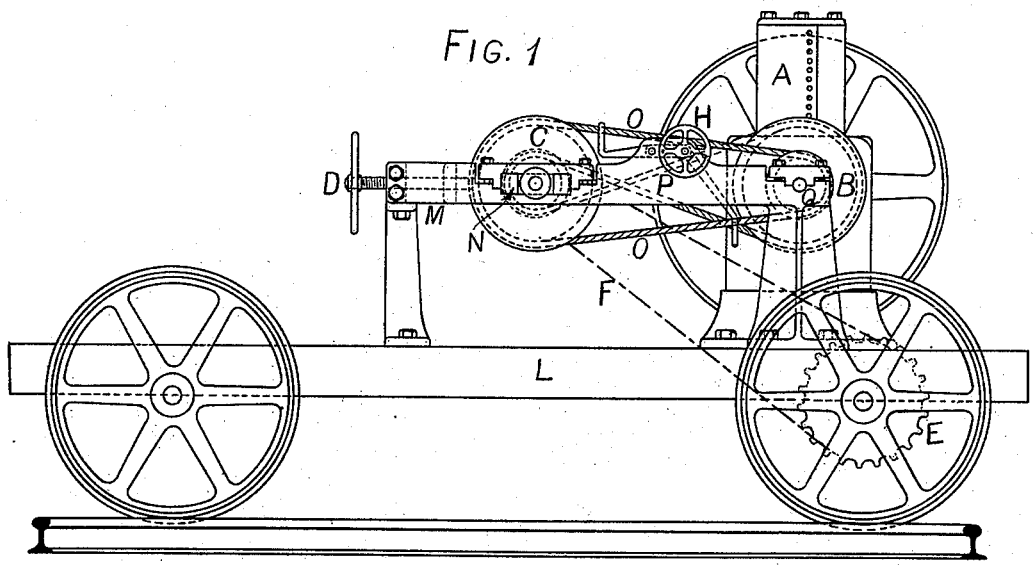
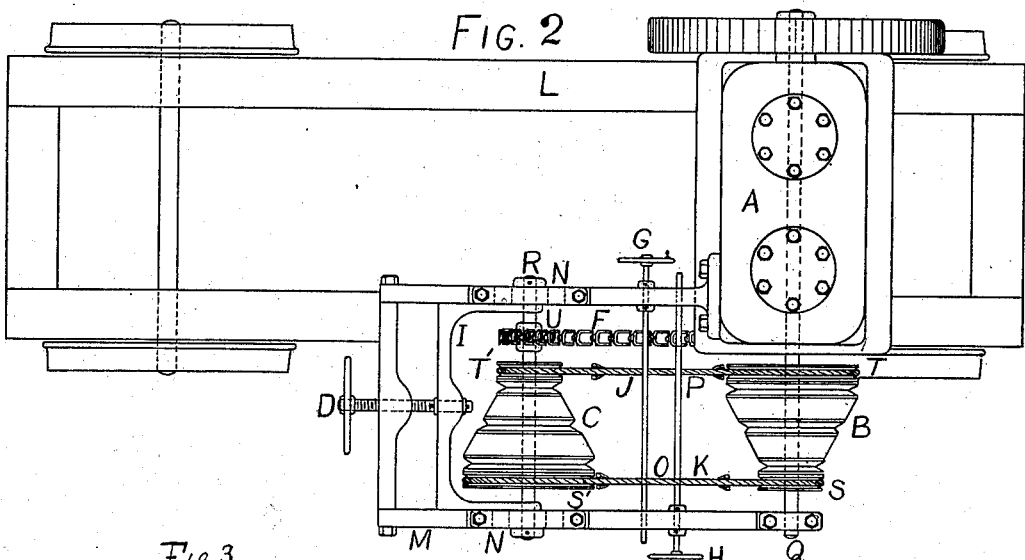
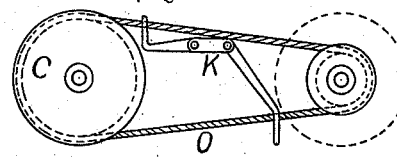
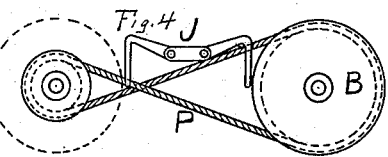
WITNESSES:
Chas. L. Sturtevant,
F. L. Middleton.
INVENTORS,
Lucius B. Gibson,
BY Ellis Spear
ATTORNEY.

UNITED STATES PATENT OFFICE.

LUCIUS B. GIBSON, OF PUEBLO, COLORADO.

MOTOR FOR STREET-CARS.

SPECIFICATION forming part of Letters Patent No. 384,145, dated June 5, 1888.

Application filed April 2, 1888. Serial No. 269,391. (No model.)

*To all whom it may concern:*

Be it known that I, LUCIUS B. GIBSON, of Pueblo, in the county of Pueblo and State of Colorado, have invented a new and useful Improvement in Motors for Street-Cars and like Vehicles; and I do hereby declare that the following is a full, clear, and exact description of the same.

It is the object of my invention to provide a motor for street-cars and like vehicles adapted to operate the car without connection with outside propelling devices, and without requiring any change whatever in the ordinary tracks and space between the same as now used.

Further, my object is to provide a motor of few parts, and by means of which the car may be propelled in one direction or the other and at varying rates of speed, the operating parts being under the complete control of the operator.

My invention consists of a motor comprising a source of power in such form as to be carried upon the car, a main driving-shaft, a supplemental shaft, with connections between the two shafts, and connections to drive the car between the wheel or axle thereof and the supplemental shaft.

Further, my invention includes a source of power, a main driving shaft, and a supplemental shaft, with connections between the two shafts for varying the speed, at the will of the operator, of the main shaft in its transmission to the supplemental shaft, with means for regulating the speed of the car, with means for changing the direction of the movement of the car, and with means for stopping the car, the construction also comprising details of construction which will be hereinafter more fully set forth.

In the drawings I have simply shown the frame of a car with my motor mounted thereon; but it will be understood that I simply show this in order to illustrate the application of my invention, and that the motor may be applied to any form of car, and, if desired, may be applied to a separate car adapted to connect with the ordinary passenger-cars.

Figure 1 represents a side elevation of the invention. Fig. 2 is a plan view, and Figs. 3 and 4 represent details of the shifting mechanism.

The source of power is shown at A. Preferably this is an engine run by oil; but it will be understood that I do not limit myself in this respect. The driving-shaft of this engine is shown at Q, carrying a balance-wheel, Q', upon one end. The opposite end projects beyond the frame of the car, and is supported in bearings in the outer beam of a frame, M, supported from the frame of the car by standards M' M'. On the shaft are loosely-mounted idler-wheels S T, varying in diameter, as shown, and for a purpose hereinafter described. Between the two idlers is a cone-pulley, B, rigidly secured to the shaft and tapering from the large idler T to the small idler S. This cone-pulley is provided with a series of V-shaped grooves, which may be more or less than the number shown.

Adjustably mounted in bearings in the frame M is a supplemental shaft, R, in direct line with the projecting end of the main shaft. This shaft carries a cone-pulley, C, and idler-wheels T' S', conforming exactly in size and arrangement to the exact parts upon the main shaft, with the exception that the position of the parts is reversed. A sprocket-wheel, U, is secured to the supplemental shaft R, and a sprocket-chain, F, extends from this wheel to the sprocket-wheel E, secured to one of the axles of the car. Motion is communicated from the main shaft to the supplemental shaft, and thence to the axle of the car, by means of a connecting-rope, O, between the cone-pulleys, and the speed of the car is varied according to the position of this rope in relation to the grooves in the surface of the cone-pulleys, so that the speed of the car may be varied at the will of the operator by shifting the rope from one set of grooves to another. These grooves I make V-shaped, as before intimated, as the rope gets a firmer hold of such grooves, having a greater contact-surface and are preferable to round grooves. The driving-shaft is running at all times; but when it is not desired to transmit motion to propel the car the rope O is kept upon the idler-pulleys S S', and this remains stationary, transmitting none of the power of the revolving shaft.

The rope O is for propelling the car in one direction, and upon the opposite side of the cone-pulleys is extended a second rope, P, which I cross, as shown in Fig. 4, which thus reverses the movement imparted by the rope O; and when it is desired to run the car in a reverse direction the rope O is shifted to its idler-pulleys and the rope P from its idlers to the grooves of the cone-pulleys, and thus the movement is reversed. In order to shift the ropes either from their idlers to the cone-pulleys or to different grooves in the cone-pulleys, I arrange shifting-levers J K—one set for each rope—having angular bent arms bifurcated at the ends to fit upon each side of the rope, and these shifters are operated by rods G H, respectively terminating in hand-wheels, and having screw-threaded connection with the shifters, so as to move them in one direction or the other.

When it is desired to make a temporary stop, the transmission of power from the main shaft may be interrupted by moving the supplemental shaft R toward the main shaft, thus making the driving-ropes slack. This is done on the devices shown in Fig. 2. A sliding frame, I, is held in suitable ways in the sides of the frame M, and carries the ends of the shafts R. A screw-threaded rod, D, provided with a hand-wheel, is secured to the end of the frame I and has screw-threaded connection with the end beam of the frame M, and by operating the hand-wheel the ropes O P may be slackened and the transmission of power interrupted.

I do not desire to limit myself to the use of cone-pulleys having grooved surfaces, as, instead, sprocket-wheels may be used, with connecting-chains, with friction devices thrown into or out of connection with the sprocket-wheels to transmit through them the power of the driving-shaft. Many of the other parts of the apparatus as I have described them may be changed materially without departing from the spirit of my invention. In starting up the motor it may be found desirable to slacken the connecting-ropes O P when the shaft begins to revolve, and then gradually tighten them until the full power of the engine is reached, which thus prevents any shock in starting.

As I have before described, the operation is very simple, and consists in transmitting the motion of the main shaft to a supplemental shaft, and from the supplemental shaft to the axle of the car, with simple but effective devices for changing the speed of the car, reversing the direction of its movement, and stopping or starting the car.

I claim as my invention—

1. A motor for street-cars, consisting of a source of power, a main driving-shaft, a supplemental shaft, fixed cone-pulleys on the two shafts reversed in position to each other, whereby the motion of the car may be varied, idler-pulleys on the same shafts and a connecting rope or chain between the pulleys on the shafts for communicating the motion of the main shaft to the supplemental shaft, and a driving-connection from the supplemental shaft to the axle of the car, substantially as described.

2. A motor for street-cars, consisting of a source of power, a main driving-shaft, a pulley on said shaft, a supplemental shaft having a pulley fixed thereto, a double set of idler-wheels loosely mounted on said shaft, and connecting ropes or chains extending between the pulleys on the two shafts, one of said driving-ropes being crossed, whereby motion of the car may be reversed.

3. A motor for street-cars, consisting of a source of power, a main driving-shaft, a cone-pulley having a grooved face, a supplemental shaft, a grooved cone-pulley thereon reversed in position to the pulley on the main shaft, idler-pulleys on said shaft, and two connecting ropes or chains for propelling the car in two directions, and a driving-chain between the supplemental shaft and the axle of the car, substantially as described.

4. A motor for street-cars, consisting of a source of power, a main driving-shaft carrying a cone-pulley, and an adjustable supplemental shaft, also carrying a cone-pulley, idler-wheels, connecting-ropes between the pulleys, and a driving-connection between the supplemental shaft and the axle of the car.

In testimony whereof I have signed my name to this specification in the presence of two subscribing witnesses.

LUCIUS B. GIBSON.

Witnesses:
D. J. SIPE,
E. H. MARTIN.